United States Patent
Kim et al.

(10) Patent No.: US 10,921,929 B2
(45) Date of Patent: Feb. 16, 2021

(54) TOUCH SCREEN PANEL AND METHOD OF MANUFACTURING THE SAME

(71) Applicant: Samsung Display Co., Ltd., Yongin (KR)

(72) Inventors: Jeong-Hwan Kim, Cheonan-si (KR); Jonghyun Choi, Seoul (KR); Wonbaek Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/601,665

(22) Filed: Jan. 21, 2015

(65) Prior Publication Data

US 2016/0026293 A1 Jan. 28, 2016

(30) Foreign Application Priority Data

Jul. 24, 2014 (KR) .......................... 10-2014-0094181

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01); *G06F 3/0443* (2019.05); *G06F 3/0446* (2019.05); *G06F 2203/04103* (2013.01)

(58) Field of Classification Search
CPC ........................................... G06F 3/044–0448
See application file for complete search history.

(56) References Cited

U.S. PATENT DOCUMENTS

| | | | |
|---|---|---|---|
| 8,654,087 B2 | 2/2014 | Kang et al. | |
| 9,128,663 B1* | 9/2015 | Lai | G06F 1/16 |
| 9,383,878 B2* | 7/2016 | Misaki | G06F 3/044 |
| 9,552,120 B2* | 1/2017 | Bae | G06F 3/044 |
| 9,864,241 B1* | 1/2018 | Pedder | G06F 3/041 |
| 9,880,681 B2* | 1/2018 | Kang | G06F 3/044 |
| 2010/0045613 A1* | 2/2010 | Wu | G06F 3/044 |
| | | | 345/173 |

(Continued)

FOREIGN PATENT DOCUMENTS

KR   10-1119269 B1   2/2012
KR   10-2013-0022170 A   3/2013

(Continued)

*Primary Examiner* — Patrick F Marinelli
(74) *Attorney, Agent, or Firm* — Lewis Roca Rothgerber Christie LLP (57) ABSTRACT

A touch screen panel for a display device and a method of manufacturing the same are disclosed. In one aspect, the touch screen panel includes a touch substrate including a touch non-recognizing area and a touch recognizing area, and a peripheral wiring formed over the touch non-recognizing area. The peripheral wiring includes a first peripheral layer, a transparent peripheral layer formed over the first peripheral layer, a second peripheral layer formed over the transparent peripheral layer, and a corrosion stop layer formed over the second peripheral layer so as to prevent corrosion. The panel also includes a sensing electrode formed over the touch recognizing area. The sensing electrode includes a first sensing layer formed on the same layer as the first peripheral layer and a transparent sensing layer formed over the first sensing layer and formed on the same layer as the transparent peripheral layer.

10 Claims, 7 Drawing Sheets

(56) References Cited

U.S. PATENT DOCUMENTS

| | | | |
|---|---|---|---|
| 2010/0171718 A1* | 7/2010 | Denda | G06F 3/044 345/173 |
| 2010/0253646 A1* | 10/2010 | Hiratsuka | G06F 3/044 345/174 |
| 2011/0134055 A1* | 6/2011 | Jung | G06F 3/044 345/173 |
| 2012/0033168 A1* | 2/2012 | Hwang | G02F 1/13338 349/139 |
| 2012/0176323 A1* | 7/2012 | Cho | G06F 3/044 345/173 |
| 2012/0206395 A1* | 8/2012 | Misaki | G06F 3/0412 345/173 |
| 2012/0247938 A1* | 10/2012 | Saito | G06F 3/044 200/600 |
| 2013/0000952 A1* | 1/2013 | Srinivas | G06F 3/044 174/126.1 |
| 2013/0122251 A1* | 5/2013 | Matsumoto | G06F 3/044 428/141 |
| 2013/0181727 A1* | 7/2013 | Nishizawa | G06F 3/044 324/658 |
| 2013/0257519 A1* | 10/2013 | Chuang | G06F 3/044 327/517 |
| 2013/0293096 A1* | 11/2013 | Kang | H01L 27/3225 313/511 |
| 2014/0001148 A1* | 1/2014 | Sakata | G06F 3/044 216/13 |
| 2014/0071637 A1* | 3/2014 | Hsu | H05K 1/0213 361/748 |
| 2014/0110236 A1* | 4/2014 | Lee | G06F 3/044 200/5 A |
| 2014/0111708 A1* | 4/2014 | Cheng | G01R 27/2605 349/12 |
| 2014/0247226 A1* | 9/2014 | Chiu | G06F 3/041 345/173 |
| 2014/0313442 A1* | 10/2014 | Misaki | G06F 3/041 349/12 |
| 2014/0333578 A1* | 11/2014 | Wu | G06F 3/044 345/174 |
| 2014/0333855 A1* | 11/2014 | Park | G06F 3/041 349/12 |
| 2014/0339067 A1* | 11/2014 | Wang | G06F 3/0412 200/600 |
| 2015/0009422 A1* | 1/2015 | Tung | G06F 3/044 349/12 |
| 2015/0022739 A1* | 1/2015 | Chen | G06F 3/044 349/12 |
| 2015/0092119 A1* | 4/2015 | Yeh | G06F 3/041 349/12 |
| 2015/0144380 A1* | 5/2015 | Yang | H05K 1/097 174/253 |
| 2015/0145807 A1* | 5/2015 | Wang | G06F 3/044 345/174 |
| 2015/0145813 A1* | 5/2015 | Takiguchi | G06F 3/044 345/174 |
| 2015/0169104 A1* | 6/2015 | Park | G06F 3/044 345/174 |
| 2015/0169111 A1* | 6/2015 | Hashimoto | G06F 3/044 345/174 |
| 2015/0185887 A1* | 7/2015 | Park | H05K 13/0469 345/173 |
| 2015/0212617 A1* | 7/2015 | Yoo | G06F 3/044 345/174 |
| 2015/0220183 A1* | 8/2015 | Youngs | G06F 3/044 345/173 |
| 2015/0242011 A1* | 8/2015 | Yeh | B32B 15/04 345/174 |
| 2015/0309604 A1* | 10/2015 | Lai | G06F 3/044 345/173 |
| 2015/0313013 A1* | 10/2015 | Kim | G06F 3/041 136/256 |
| 2016/0026293 A1* | 1/2016 | Kim | G06F 3/044 345/173 |
| 2016/0026297 A1* | 1/2016 | Shinkai | G06F 3/044 345/174 |
| 2016/0041644 A1* | 2/2016 | Bae | G06F 3/044 345/174 |
| 2016/0041647 A1* | 2/2016 | Bae | G06F 3/044 345/174 |
| 2016/0103517 A1* | 4/2016 | Kang | G06F 3/044 345/174 |
| 2016/0147360 A1* | 5/2016 | Kang | C23F 1/02 345/173 |
| 2016/0195979 A1* | 7/2016 | Lee | G06F 3/044 345/173 |
| 2016/0216827 A1* | 7/2016 | Lee | G06F 3/044 |
| 2016/0229154 A1* | 8/2016 | Yeh | B32B 15/04 |
| 2016/0291712 A1* | 10/2016 | Lim | G06F 3/041 |
| 2016/0291754 A1* | 10/2016 | Jin | G06F 3/0412 |
| 2016/0299599 A1* | 10/2016 | Kang | G06F 3/044 |
| 2017/0228071 A1* | 8/2017 | Yoon | G06F 3/044 |
| 2018/0011575 A1* | 1/2018 | Yoon | G06F 3/044 |
| 2018/0113535 A1* | 4/2018 | Kang | G06F 3/044 |

FOREIGN PATENT DOCUMENTS

| | | |
|---|---|---|
| KR | 10-2013-0068502 A | 6/2013 |
| KR | 10-1383649 B1 | 4/2014 |
| KR | 10-2015-0045238 A | 4/2015 |

* cited by examiner

TOUCH SCREEN PANEL AND METHOD OF MANUFACTURING THE SAME

INCORPORATION BY REFERENCE TO ANY PRIORITY APPLICATIONS

This U.S. non-provisional patent application claims priority under 35 U.S.C. § 119 of Korean Patent Application No. 10-2014-0094181, filed on Jul. 24, 2014, the entire contents of which are hereby incorporated by reference.

BACKGROUND

1. Field

The described technology generally relates to a touch screen panel and a method of manufacturing the same.

2. Description of the Related Technology

A touch screen panel allows a user to select instruction contents displayed on a screen, such as a display device, or the like, with the user's hand or an object.

To this end, the touch screen panel is provided on a front side of the display device to convert a contact position directly contacted by the hand or the object into an electric signal. Therefore, the instruction contents selected at the contact position are recognized as an input signal.

Since the touch screen panel as described above may substitute a separate input device, such as a keyboard or a mouse connected to the display device, applications thereof have been gradually increasing. A resistance film method, a light sensing method, a capacitance method and the like are known as methods for implementing such touch screen panels.

The capacitance type touch screen panel converts a contact position to an electrical signal by sensing a change of a capacitance formed between a conductive sensing electrode and a neighboring sensing electrode or a ground electrode when the hand or the object contacts the touch screen.

SUMMARY OF CERTAIN INVENTIVE ASPECTS

One inventive aspect is a touch screen panel that may improve reliability.

Another aspect is a method of manufacturing a touch screen panel that may improve reliability.

Another aspect is a touch screen panels including a touch substrate, a peripheral wiring, and a sensing electrode. The touch substrate includes a touch non-recognizing area which does not recognize touch and a touch recognizing area which recognizes the touch. The peripheral wiring is formed on the touch non-recognizing area. The peripheral wiring includes a first peripheral layer, a transparent peripheral layer formed on the first peripheral layer, a second peripheral layer formed on the transparent peripheral layer, and a corrosion stop layer formed on the second peripheral layer to prevent corrosion. The sensing electrode includes a first sensing layer formed on the touch recognizing area on the same layer as the first peripheral layer, and a transparent sensing layer formed on the first sensing layer on the same layer as the transparent peripheral layer.

In some embodiments, a reactivity of the corrosion stop layer is lower than a reactivity of the second peripheral layer.

In some embodiments, a resistivity of the second peripheral layer is lower than a resistivity of the corrosion stop layer.

In some embodiments, the corrosion stop layer includes one or more selected from the group including indium tin oxide (ITO), indium zinc oxide (IZO) and indium gallium zinc oxide (IGZO).

In some embodiments, the corrosion stop layer includes one or more selected from the group including Ti, Ag, Au, Pt, a silver palladium copper alloy (APC), and a silver palladium alloy (AP).

In some embodiments, the above touch screen panel further includes a pad area and a fan-out area which are formed on the touch non-recognizing area. The peripheral wiring includes a pad wiring and a fan-out wiring. The pad area includes a drive chip providing a sensing signal to the sensing electrode, and the pad wiring electrically connecting the drive chip and the sensing electrode. The fan-out area includes the fan-out wiring connecting the pad wiring and the sensing electrode.

In some embodiments, the first peripheral layer and the first sensing layer each includes silver (Ag).

In some embodiments, the first peripheral layer and the first sensing layer each includes a silver nano wire.

In some embodiments, the transparent sensing layer and the transparent peripheral layer each includes one or more selected from the group including indium tin oxide (ITO), indium zinc oxide (IZO) and indium gallium zinc oxide (IGZO).

In some embodiments, the second peripheral layer includes one or more selected from the group including Al, Mo, and Nd.

In some embodiments, the sensing electrode includes first sensing electrodes extending in a first direction and spaced apart from each other, and second sensing electrodes extending in a second direction crossing the first direction, spaced apart from each other and insulated from the first sensing electrodes.

Another aspect is a method of manufacturing a touch screen panel that includes: forming a first layer on a touch substrate; forming a transparent layer on the first layer; forming a second layer on the transparent layer; forming a third layer on the second layer; patterning the first layer, the transparent layer, the second layer and the third layer to form a peripheral pattern and a sensing pattern; and selectively etching the second layer and the third layer of the sensing pattern to form a sensing electrode.

In some embodiments, a reactivity of the third layer is lower than a reactivity of the second layer.

In some embodiments, a resistivity of the second layer is lower than a resistivity of the third layer.

In some embodiments, the forming of the third layer includes forming the third layer of one or more selected from the group including indium tin oxide (ITO), indium zinc oxide (IZO) and indium gallium zinc oxide (IGZO).

In some embodiments, the forming of the third layer includes forming the third layer of one or more selected from the group including Ti, Ag, Au, Pt, a silver palladium copper alloy (APC), and a silver palladium alloy (AP).

In some embodiments, the forming of the peripheral wiring and the sensing pattern includes forming a photoresist layer on the third layer, exposing and developing the photoresist layer by using the first mask to form a first photoresist pattern, and forming a peripheral wiring and a sensing pattern by using the first photoresist pattern as a mask.

In some embodiments, the forming of the sensing electrode includes selectively etching and removing the first photoresist pattern corresponding to the sensing pattern of the first photoresist pattern by using a second mask to form a second photoresist pattern, and etching and removing the second and third layers corresponding to the sensing pattern of the second and third layers to form a sensing electrode.

In some embodiments, the second and third layers corresponding to the sensing pattern of the second and third layers is etched by a single etching operation.

In some embodiments, the forming of the first layer includes forming the first layer of a metal containing a silver nanowire.

In some embodiments, the forming of the transparent layer includes forming the transparent layer of one or more selected from the group including indium tin oxide (ITO), indium zinc oxide (IZO) and indium gallium zinc oxide (IGZO).

In some embodiments, the forming of the second layer includes forming the second layer of one or more selected from the group including Al, Mo, and Nd.

Another aspect is a touch screen panel for a display device comprising a touch substrate including a touch non-recognizing area and a touch recognizing area and a peripheral wiring formed over the touch non-recognizing area. The peripheral wiring comprises a first peripheral layer, a transparent peripheral layer formed over the first peripheral layer, a second peripheral layer formed over the transparent peripheral layer, and a corrosion stop layer formed over the second peripheral layer so as to prevent corrosion. The panel also comprises a sensing electrode formed over the touch recognizing area and electrically connected to the peripheral wiring. The sensing electrode comprises a first sensing layer formed on the same layer as the first peripheral layer and a transparent sensing layer formed over the first sensing layer and formed on the same layer as the transparent peripheral layer.

In the above panel, the corrosion stop layer has a reactivity lower than that of the second peripheral layer.

In the above panel, the second peripheral layer has a resistivity lower than that of the corrosion stop layer.

In the above panel, the corrosion stop layer is formed at least partially of one or more of indium tin oxide (ITO), indium zinc oxide (IZO) and indium gallium zinc oxide (IGZO).

In the above panel, the corrosion stop layer is formed of one or more of Ti, Ag, Au, Pt, a silver palladium copper alloy (APC), and a silver palladium alloy (AP).

The above panel further comprises a drive chip configured to provide a sensing signal to the sensing electrode, wherein the touch non-recognizing area includes a pad area and a fan-out area, wherein the peripheral wiring includes a pad wiring and a fan-out wiring, wherein the drive chip is formed in the pad area, wherein the pad wiring electrically connects the drive chip to the sensing electrode, and wherein the fan-out wiring is formed in the fan-out area.

In the above panel, each of the first peripheral layer and the first sensing layer is formed at least partially of silver (Ag).

In the above panel, each of the first peripheral layer and the first sensing layer comprises a silver nano-wire.

In the above panel, each of the transparent sensing layer and the transparent peripheral layer is formed of one or more of indium tin oxide (ITO), indium zinc oxide (IZO) and indium gallium zinc oxide (IGZO).

In the above panel, the second peripheral layer is formed of one or more of Al, Mo, and Nd.

In the above panel, the sensing electrode comprises a plurality of first sensing electrodes extending in a first direction and spaced apart from each other, and a plurality of second sensing electrodes extending in a second direction crossing the first direction, spaced apart from each other, and insulated from the first sensing electrodes.

Another aspect is a method of manufacturing a touch screen panel, the method comprising forming a first layer over a touch substrate, forming a transparent layer over the first layer, forming a second layer over the transparent layer, forming a third layer over the second layer, patterning the first layer, the transparent layer, the second and third layers so as to form a peripheral wiring and a sensing pattern, and selectively etching the second and third layers so as to form a sensing electrode.

In the above method, the third layer has a reactivity lower than that of the second layer.

In the above method, the second layer has a resistivity lower than that of the third layer.

In the above method, the third layer is formed of one or more of indium tin oxide (ITO), indium zinc oxide (IZO) and indium gallium zinc oxide (IGZO).

In the above method, the third layer is formed of one or more of Ti, Ag, Au, Pt, a silver palladium copper alloy (APC), and a silver palladium alloy (AP).

In the above method, the forming of the peripheral wiring and the sensing pattern comprises forming a photoresist layer over the third layer, exposing and developing the photoresist layer via a first mask so as to form a photoresist pattern, and forming a peripheral wiring and a sensing pattern with the use of the first photoresist pattern as a mask.

In the above method, the forming of the sensing electrode comprises selectively etching the first photoresist pattern corresponding to the sensing pattern so as to form a second photoresist pattern, and etching and removing the second and third layers corresponding to the sensing pattern with the use of the second photoresist pattern as a mask so as to form a sensing electrode.

In the above method, the second and third layers corresponding to the sensing pattern are etched by the same etching operation.

In the above method, the first layer includes a silver nano-wire.

In the above method, the transparent layer is formed of one or more of indium tin oxide (ITO), indium zinc oxide (IZO) and indium gallium zinc oxide (IGZO).

In the above method, the second layer is formed of one or more of Al, Mo, and Nd.

DETAILED DESCRIPTION OF CERTAIN INVENTIVE EMBODIMENTS

A portion of wirings, formed of copper, included in a capacitance type touch screen panel may corrode under high temperature and high humidity conditions such that the reliability of a touch screen panel including the corroded wirings decreases. Copper may be formed on a peripheral layer of each of the wirings.

The above-described objects, other objects, features and advantages of the inventive concept will be easily understood from the detailed description of exemplary embodiments of the inventive concept below by referring to the accompanying drawings. The invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Like reference numerals in the drawings denote like elements. In the accompanying drawings, the dimensions of structures are exaggerated for clarity. While such terms as 'first', 'second', and the like may be used to describe various elements, such elements should not be limited to the above terms. The above terms are used only to distinguish one element from another. For example, a first element may be referred to as a second element without departing from the scope of rights of the inventive concept, and likewise a second element may be referred to as a first element. The terms in singular form may include the plural forms unless otherwise specified.

In the present specification, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In the description, it will be understood that when an element such as a layer, film, region, or substrate is referred to as being "above" or "on" another element, it may be directly on the other element or intervening elements may also be present. In the description, it will be understood that when an element such as a layer, film, region, or substrate is referred to as being "above" or "on" another element, it may be directly on the other element or intervening elements may also be present. In this disclosure, the term "substantially" includes the meanings of completely, almost completely or to any significant degree under some applications and in accordance with those skilled in the art. Moreover, "formed on" may also mean "formed over." The term "connected" may include an electrical connection.

Hereinafter, a touch screen panel according to an embodiment will be described.

Figure 1:
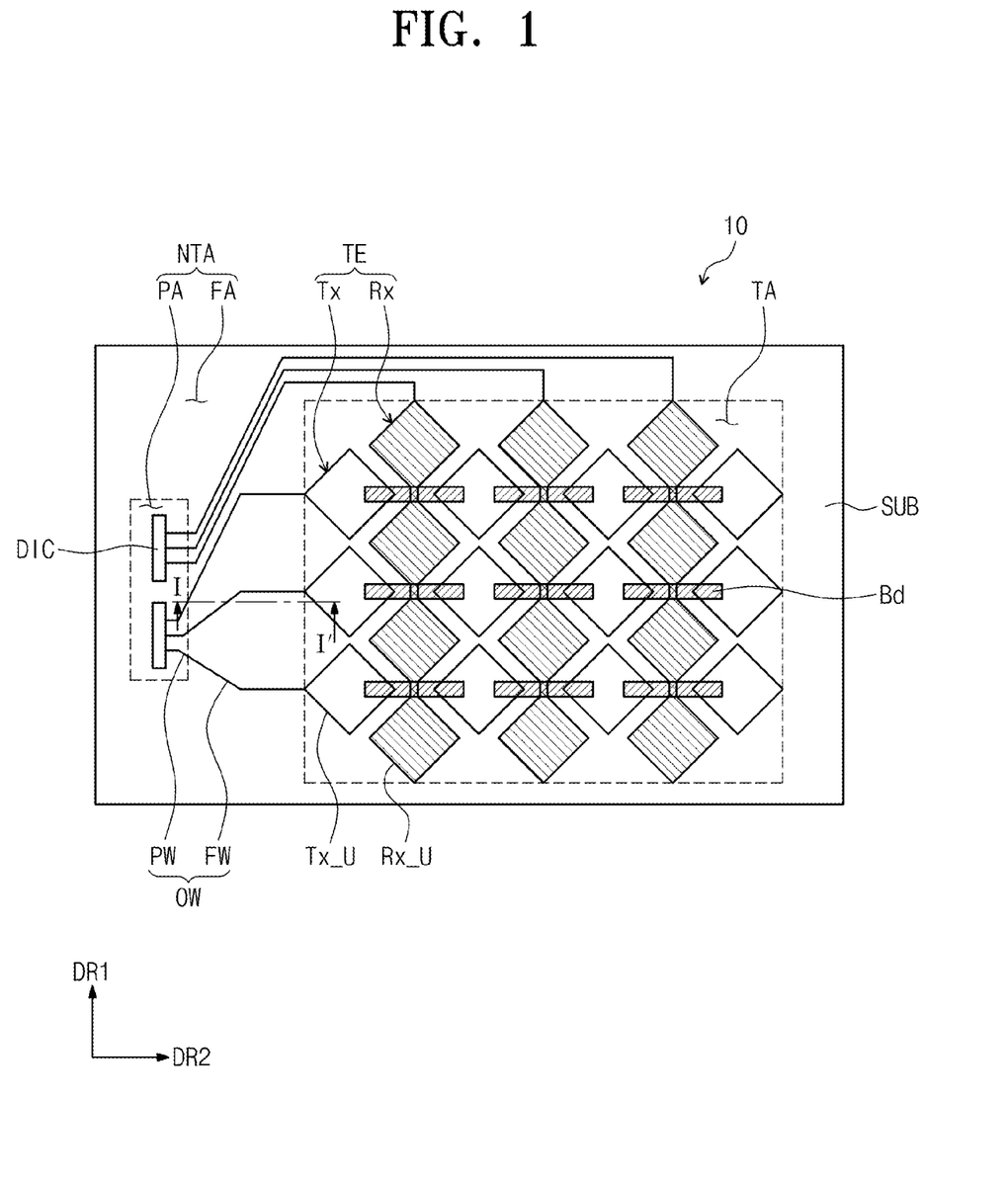
FIG. 1 is a schematic plain view of a touch screen panel according to an embodiment.
Figure 2:
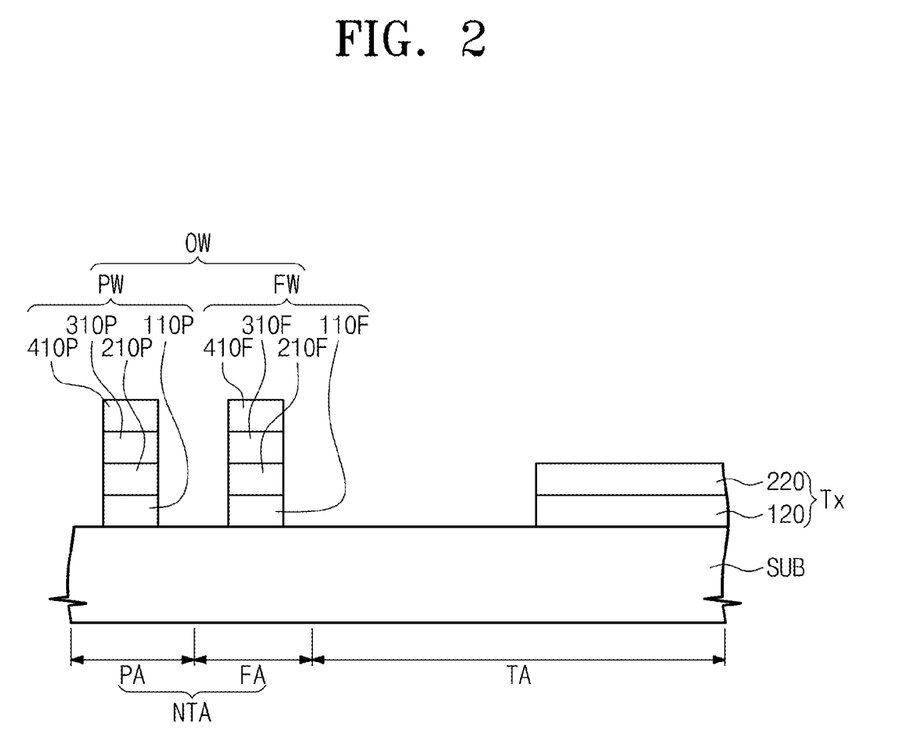
FIG. 2 is a schematic cross-sectional view taken along line I-I' of FIG. 1.

FIG. 1 is a schematic plain view of a touch screen panel according to an embodiment. FIG. 2 is a schematic cross-sectional view taken along line I-I' of FIG. 1.

Referring to FIGS. 1 and 2, a touch screen panel 10 includes a touch substrate SUB, a peripheral wiring OW, and a sensing electrode TE.

A user may input instructions by touching the touch substrate SUB. The touch substrate SUB is a transparent substrate and may be configured in the form of a transparent dielectric film. The touch substrate SUB is formed of, but not limited to, for example, plastic, glass, ceramic, polymer, or the like. The touch substrate SUB is provided, for example, in the form of a plate.

The touch substrate SUB includes a touch non-recognizing area NTA and a touch recognizing area TA. For example, the touch non-recognizing area NTA surrounds the touch recognizing area TA. The touch recognizing area TA may be substantially rectangular, but is not limited thereto.

The touch non-recognizing area NTA in which a peripheral wiring OW is formed is, for example, a dead space area surrounding the touch recognizing area TA. The peripheral wiring OW includes a pad wiring PW and a fan-out wiring FW.

The touch non-recognizing area NTA includes a pad area PA and a fan-out area FA. The pad area PA may be rectangular and the fan-out area FA may surround the pad area PA, but the pad area PA and the fan-out are FA are not limited thereto.

The pad area PA includes a drive chip DIC providing a sensing signal to a sensing electrode TE, and a pad wiring PW electrically connecting the drive chip DIC and the sensing electrode TE.

While FIG. 1 exemplarily shows that the pad area PA is formed on the left of the touch recognizing area TA, the described technology is not limited thereto and the pad area PA may be formed on various positions, for example, on the right, upper side, lower side, and the like.

While FIG. 1 exemplarily shows that the drive chip DIC has two drive chips, the described technology is not limited thereto and the drive chip DIC may have one drive chip or two or more drive chips. The drive chip DIC may include, for example, a signal supply unit (not shown) and a signal processing unit (not shown). The signal supply unit (not shown) may sequentially supply a sensing signal to the sensing electrodes TE, and the signal processing unit (not shown) may sense a delay value of the sensing signal, thus sensing a touch coordinate. The touch screen panel 10 according to an embodiment senses a touch coordinate by allowing the drive chip DIC to supply a sensing signal to the pad wiring PW and the fan-out wiring FW and sensing the delay value of the sensing signal supplied to the pad wiring PW and the fan-out wiring FW from a difference between the time when a touch is generated and the time when a touch is not generated.

The fan-out area FA includes a fan-out wiring FW connecting the pad wiring PW and the sensing electrode TE. The fan-out wiring FW connects the pad wiring PW and the sensing electrode TE to supply a sensing signal.

The peripheral wiring OW includes a first peripheral layer 110P, 110F, a transparent peripheral layer 210P, 210F, a second peripheral layer 310P, 310F, and a corrosion stop layer 410P, 410F.

The first peripheral layer 110P, 110F is formed on a touch substrate SUB. The first peripheral layer 110P, 110F includes a first pad peripheral layer 110P and a first fan-out peripheral layer 110F.

The first peripheral layer 110P, 110F may be formed of silver (Ag). The first peripheral layer 110P, 110F may be formed of a silver nano-wire.

The transparent peripheral layer 210P, 210F is formed on the first peripheral layer 110P, 110F. The transparent peripheral layer 210P, 210F includes a transparent pad peripheral layer 210P and a transparent fan-out peripheral layer 210F.

The transparent peripheral layer 210P, 210F may be formed of a transparent conductive oxide (TCO). For example, the transparent peripheral layer 210P, 210F includes one or more material selected from the group including indium tin oxide (ITO), indium zinc oxide (IZO) and indium gallium zinc oxide (IGZO).

The second peripheral layer 310P, 310F is formed on the transparent peripheral layer 210P, 210F. The second peripheral layer 310P, 310F includes a second pad peripheral layer 310P and a second fan-out peripheral layer 310F.

The second peripheral layer 310P, 310F may be formed of one or more materials selected from the group including Al, Mo, and Nd.

The corrosion stop layer 410P, 410F is formed on the second peripheral layer 310P, 310F. The corrosion stop layer 410P, 410F includes a corrosion stop pad layer 410P and a corrosion stop fan-out layer 410F. The corrosion stop layer 410P, 410F may prevent the second peripheral layer 310P, 310F from being corroded.

The corrosion stop layer 410P, 410F may include be formed of one or more materials selected from the group including indium tin oxide (ITO), indium zinc oxide (IZO) and indium gallium zinc oxide (IGZO). The corrosion stop layer 410P, 410F may be formed of one or more materials selected from the group including Ti, Ag, Au, Pt, a silver palladium copper alloy (APC), and a silver palladium alloy (AP).

As described above, the peripheral wiring OW includes a pad wiring PW and a fan-out wiring FW.

The pad wiring PW includes a first peripheral pad layer 110P, a transparent peripheral pad layer 210P, a second peripheral pad layer 310P, and a corrosion stop pad layer 410P.

The first peripheral pad layer 110P is formed on the touch substrate SUB. The transparent peripheral pad layer 210P is formed on the first peripheral pad layer 110P. The second peripheral pad layer 310P is formed on the transparent peripheral pad layer 210P. The corrosion stop pad layer 410P is formed on the second peripheral pad layer 310P.

The fan-out wiring FW includes a first peripheral fan-out layer 110F, a transparent peripheral fan-out layer 210F, a second peripheral fan-out layer 310F, and a corrosion stop fan-out layer 410F.

The first peripheral fan-out layer 110F is formed on the touch substrate SUB. The first peripheral fan-out layer 110F is formed on the same layer as the first peripheral pad layer 110P. The transparent peripheral fan-out layer 210F is formed on the first peripheral fan-out layer 110F and is formed on the same layer as the transparent peripheral pad layer 210P. The second peripheral fan-out layer 310F is formed on the transparent peripheral fan-out layer 210F and is formed on the same layer as the second peripheral pad layer 310P. The corrosion stop fan-out layer 410F is formed on the second peripheral fan-out layer 310F and is formed on the same layer as the corrosion stop pad layer 410P.

The corrosion stop layer 410P, 410F may have a reactivity lower than that of the second peripheral layer 310P, 310F. For example, when the second peripheral layer 310P, 310F includes one or more materials selected from the group including Al, Mo, and Nd, the corrosion stop layer 410P, 410F includes one or more materials selected from the group including Ti, Ag, Au, Pt, a silver palladium copper (APC) alloy, and a silver palladium (AP) alloy having a reactivity lower than that of each of Al, Mo and Nd. Thus, the corrosion stop layer 410P, 410F may prevent the second peripheral layer 310P, 310F from being corroded.

The second peripheral layer 310P, 310F may have a resistivity lower than that of the corrosion stop layer 410P, 410F. Thus, the resistance of the peripheral wiring OW may be minimized.

The touch recognizing area TA is an area on which the sensing electrode TE is formed and recognizes a touch input by a user. When a user touch is generated, a change in capacitance between the sensing electrodes TE, for example, between a first sensing electrode Tx and a second sensing electrode Rx is generated and a sensing signal applied according to the change in capacitance is delayed. The touch screen panel 10 may sense a touch coordinate from a delay value of the sensing signal.

The sensing electrodes TE include a first sensing layer 120 and a transparent sensing layer 220.

The first sensing layer 120 is formed on the touch substrate SUB. The first sensing layer 120 is formed on the same layer as the first peripheral layer 110P, 110F. The first sensing layer 120 may be formed of silver (Ag). The first sensing layer 120 may include a silver nano-wire.

The transparent sensing layer 220 is formed on the first sensing layer 120. The transparent sensing layer 220 may be formed on the same layer as the transparent peripheral layer 210P, 210F. The transparent sensing layer 220 may be formed of a transparent conductive oxide (TCO). For example, the transparent sensing layer 220 may be formed of one or more of indium tin oxide (ITO), indium zinc oxide (IZO) and indium gallium zinc oxide (IGZO).

The sensing electrodes TE are connected to the peripheral wiring OW. The sensing electrode TE may be connected to the fan-out wiring FW.

The sensing electrodes TE may include first sensing electrodes Tx and second sensing electrodes Rx.

The first sensing electrodes Tx extend in a first direction (e.g., a direction of DR1) and are spaced apart from each other. The first sensing electrodes Tx each include a plurality of first unit sensing electrodes Tx_U. The first unit sensing electrodes Tx_U are spaced apart in the first direction (e.g., the direction of DR1) from each other and spaced apart in a second direction (e.g., a direction of DR2) from each other.

The second sensing electrodes Rx extend in the second direction (e.g., the direction of DR2), are spaced apart from each other, and are insulated from the first sensing electrodes Tx. The second sensing electrodes Rx each includes a plurality of second unit sensing electrodes Rx_U. The second sensing electrodes Rx are spaced apart in the second direction (e.g., the direction of DR2) from each other and are connected to each other in the first direction (e.g., the direction of DR1). While FIG. 1 exemplarily shows that the first unit sensing electrodes Tx_U and the second unit sensing electrodes Rx_U have a trapezoidal shape as viewed from top, the described technology is not limited thereto and the first unit sensing electrodes Tx_U and the second unit sensing electrodes Rx_U may have various shapes, such as a triangle, a rectangle, or the like.

While FIG. 1 exemplarily shows that each of the first unit sensing electrodes Tx_U and the second unit sensing electrodes Rx_U are connected to the single peripheral wiring OW, the described technology is not limited thereto and each of the first unit sensing electrodes Tx_U and the second unit sensing electrodes Rx_U may be connected to the two peripheral wirings OW. That is, the peripheral wiring transferring a sensing signal received from the drive chip DIC may be different from the peripheral wiring transferring a delayed sensing signal.

While FIG. 1 exemplarily shows that the drive chip DIC connected to the peripheral wiring OW connected to the first sensing electrodes Tx is different from the drive chip DIC connected to the peripheral wiring OW connected to the second sensing electrodes Rx, the described technology is not limited thereto and the peripheral wirings OW may be connected to the same drive chip DIC. While FIG. 1 exemplarily shows that the position of the drive chip DIC connected to the peripheral wirings OW connected to the first sensing electrodes Tx and the position of the drive chip DIC connected to the peripheral wirings OW connected to the second sensing electrodes Rx are left of the touch recognizing area TA, the described technology is not limited thereto and the position of the drive chip DIC connected to the peripheral wirings OW connected to the first sensing electrodes Tx and the position of the drive chip DIC connected to the peripheral wirings OW connected to the second sensing electrodes Rx may be on the right, upper side, or lower side of the touch recognizing area TA.

The touch screen panel according to an embodiment may further include a bridge Bd. The bridge Bd connects the first unit sensing electrodes Tx_U spaced apart in the second direction (e.g., the direction of DR2) from each other. The bridge Bd electrically connects the first unit sensing electrodes Tx_U spaced apart from each other. While the above embodiment exemplarily shows and describes that the bridge Bd in the touch screen panel 10 connects the first unit sensing electrodes Tx_U, the described technology is not limited thereto and the bridge Bd may connect the second unit sensing electrodes Rx_U.

Although not shown in the drawings, the touch screen panel 10 according to an embodiment may include a touch substrate SUB, a peripheral wiring OW formed on the touch substrate SUB, and an overcoat layer covering a sensing electrode TE formed on the touch substrate SUB.

Although not shown in the drawings, the touch screen panel according to an embodiment may include a display panel. The display panel displays an image. The display panel may include various display panels, such as a liquid crystal display panel, an organic light emitting diode (OLED) display panel, a plasma display panel, an electrophoretic display panel, and an electrowetting display panel.

The touch screen panel 10 according to an embodiment may include a corrosion stop layer to prevent wirings from being corroded under conditions of high temperature and high humidity. The condition of high temperature and high humidity may indicate a condition of a temperature of about 50° C. to about 100° C. and a humidity of about 80% to about 100%. For example, the condition of high temperature and high humidity includes a condition of a temperature of about 85° C. and a humidity of about 85%, or a condition of about 60° C. and a humidity of about 93%. The humidity may be an absolute humidity or a relative humidity. Alternatively, the second peripheral layer may be formed of a material having a low resistivity to minimize the resistance of the peripheral wiring. Thus, the response rate of the touch screen panel may be enhanced and the power consumption may be reduced. The touch screen panel according to an embodiment may improve reliability by preventing wirings from being corroded and enhancing the response rate.

Hereinafter, a method of manufacturing a touch screen panel according to an embodiment will be described. Hereinafter, description will be made in detail on a difference basis from the above description regarding the touch screen panel according to an embodiment, and non-described elements will follow the above description regarding the touch screen panel according to an embodiment.

Figure 3:
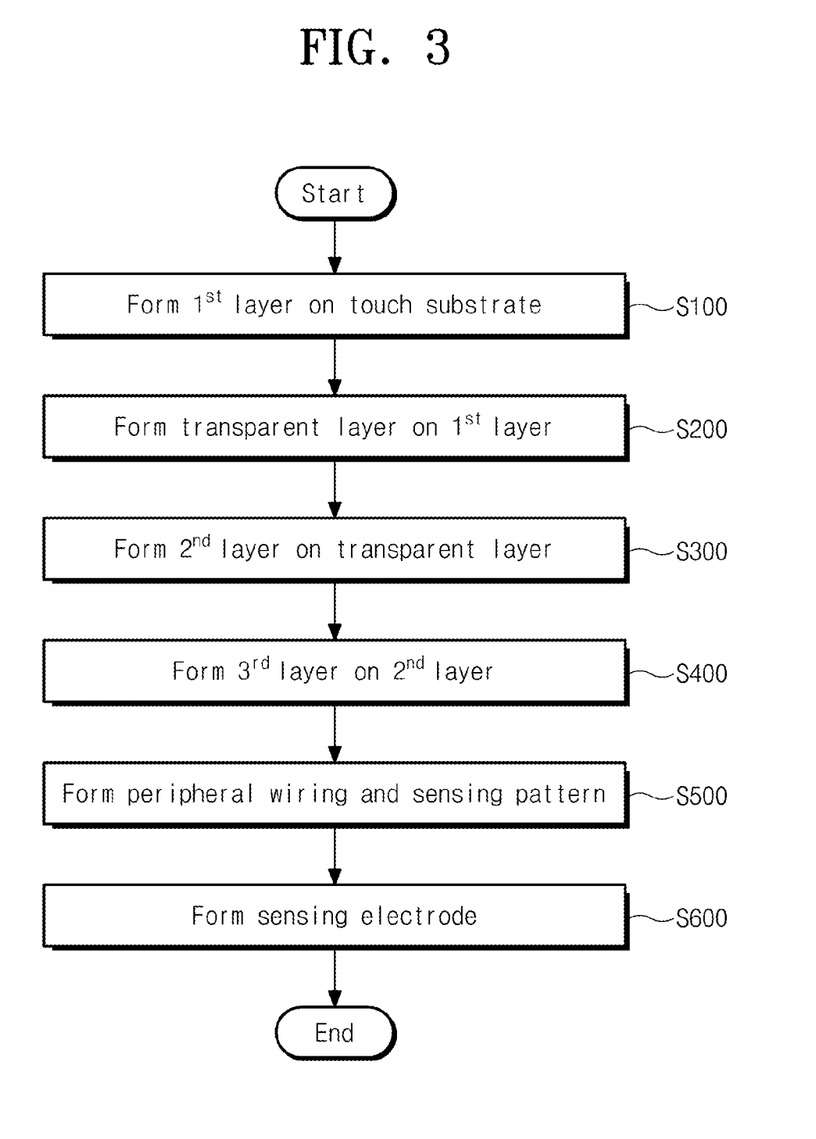
FIG. 3 is a flow diagram schematically showing a method of manufacturing a touch screen panel according to an embodiment.

FIG. 3 is a flow diagram schematically showing a method of manufacturing a touch screen panel according to an embodiment.

FIGS. 4A through 4G are cross-sectional views sequentially illustrating a method of manufacturing a touch screen panel according to an embodiment.

Referring to FIGS. 1 to 3 and FIG. 4A, a first layer 100 is formed on a touch substrate SUB (S100). The forming (S100) of the first layer 100 may include forming the first layer of a metal including a silver nano-wire.

Figure 4A:
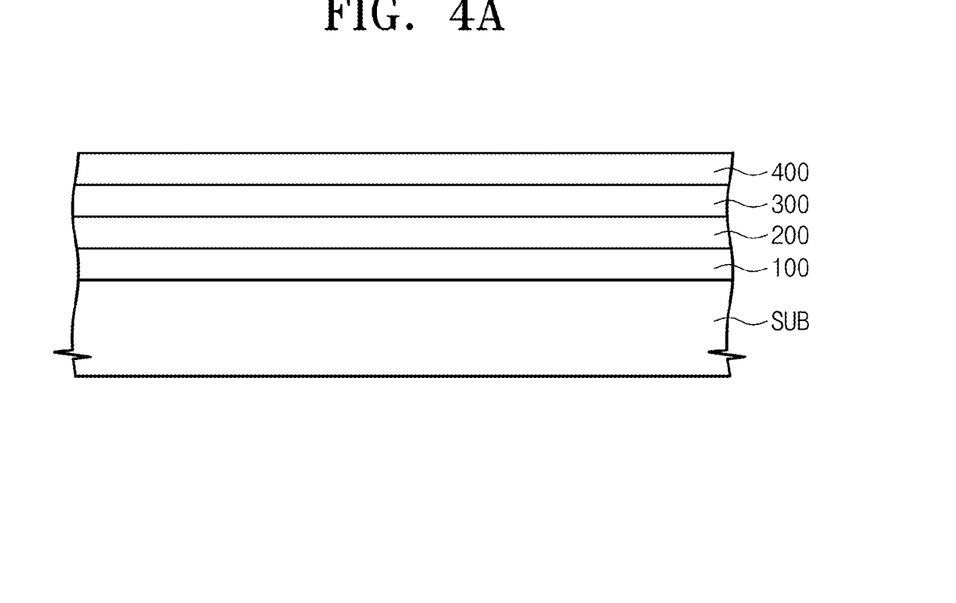
FIGS. 4A through 4G are cross-sectional views sequentially illustrating a method of manufacturing a touch screen panel according to an embodiment.
Figure 4B:
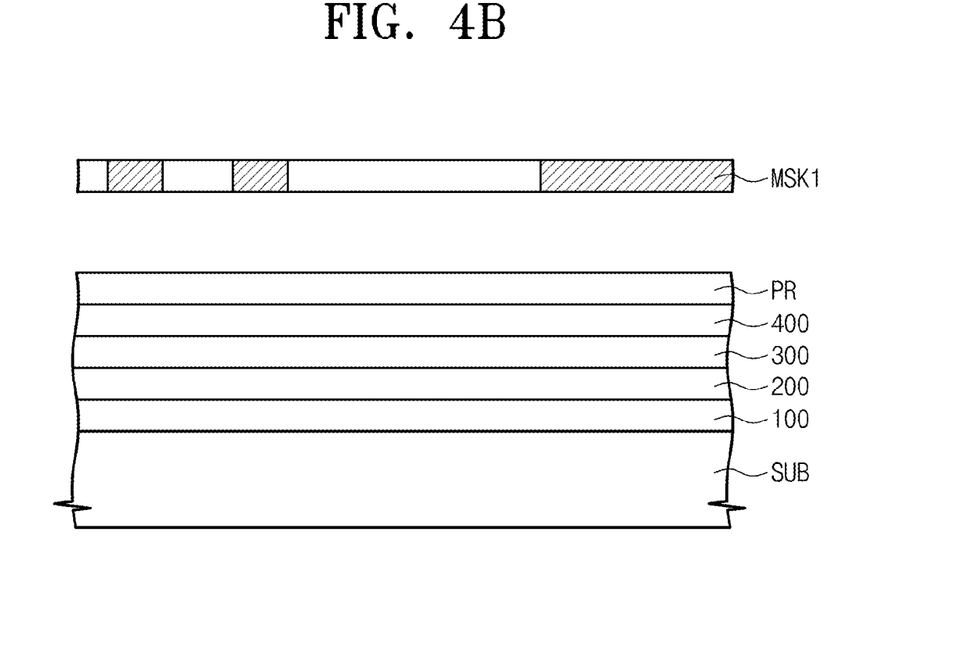
Figure 4C:
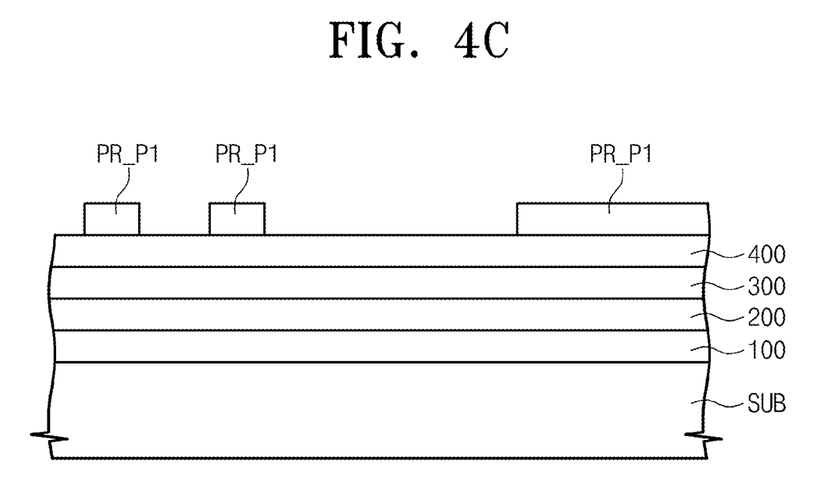

A transparent layer 200 is formed on the first layer 100 (S200). The forming (S200) of the transparent layer 200 may include forming the transparent layer 200 of one or more materials selected from the group including indium tin oxide (ITO), indium zinc oxide (IZO) and indium gallium zinc oxide (IGZO).

A second layer 300 is formed on the transparent layer 200 (S300). The forming (S300) of the second layer 300 may include forming the second layer 300 of one or more materials selected from the group including Al, Mo, and Nd.

A third layer 400 is formed on the second layer 300 (S400). The forming (S400) of the third layer 400 may include forming the third layer 400 of one or more materials selected from the group including indium tin oxide (ITO), indium zinc oxide (IZO) and indium gallium zinc oxide (IGZO). The forming (S400) of the third layer 400 may include forming the third layer 400 of one or more materials selected from the group including Ti, Ag, Au, Pt, a silver palladium copper alloy (APC), and a silver palladium alloy (AP).

The third layer 400 may have a reactivity lower than that of the second layer 300. For example, when the second layer 300 includes one or more of Al, Mo, and Nd, the third layer 400 includes one or more of Ti, Ag, Au, Pt, a silver palladium copper (APC) alloy, and a silver palladium (AP) alloy having a reactivity lower than that of each of Al, Mo and Nd. Thus, the third layer 400 may prevent the second layer 300 from being corroded.

The second layer 300 may have a resistivity lower than that of the third layer 400. Thus, the resistance of the peripheral wiring OW may be minimized.

Referring to FIG. 3, the method of manufacturing a touch screen panel according to an embodiment includes patterning the first to third layers 100, 300 and 400 to form a peripheral pattern OW and a sensing pattern TE_P (S500). While FIG. 3 exemplarily shows that the thicknesses of the first layer to the third layers 100, 300 and 400 are substantially equal to one another, the described technology is not limited thereto and the thicknesses of the first layer to the third layer 100, 300 and 400 may be at least partially different from one another.

The forming (S500) of the peripheral wiring OW and the sensing pattern TE_P may include forming a photoresist (PR) layer on the third layer 400. The forming (S500) may also include exposing and developing the photoresist layer by using a first mask MSK1 to form a first photoresist pattern PR_P1. The forming (S500) may further include forming a peripheral wiring OW and a sensing pattern TE_P by using the first photoresist pattern PR_P1 as a mask.

Referring to FIGS. 1 to 3 and FIG. 4B, a photoresist (PR) layer is formed on the third layer 400. The photoresist (PR) layer may be formed by coating a photoresist composition. A first mask MSK1 is aligned over the photoresist (PR) layer. The thickness of the photoresist (PR) layer may be substantially equal to or different from at least a portion of one of the thicknesses of the first layer 100, the transparent layer 200, the second layer 300, and the third layer 400.

Referring to FIGS. 1 to 3 and FIG. 4C, the photoresist (PR) layer is exposed to light and developed by using the first mask MSK1 to form a first photoresist pattern PR_P1. The widths of portions of the first photoresist pattern PR_1 may vary.

Referring to FIGS. 1 to 3 and FIG. 4D, a peripheral wiring OW and a sensing pattern TE_P are formed by using the first photoresist pattern PR_P1 as a mask.

Figure 4D:
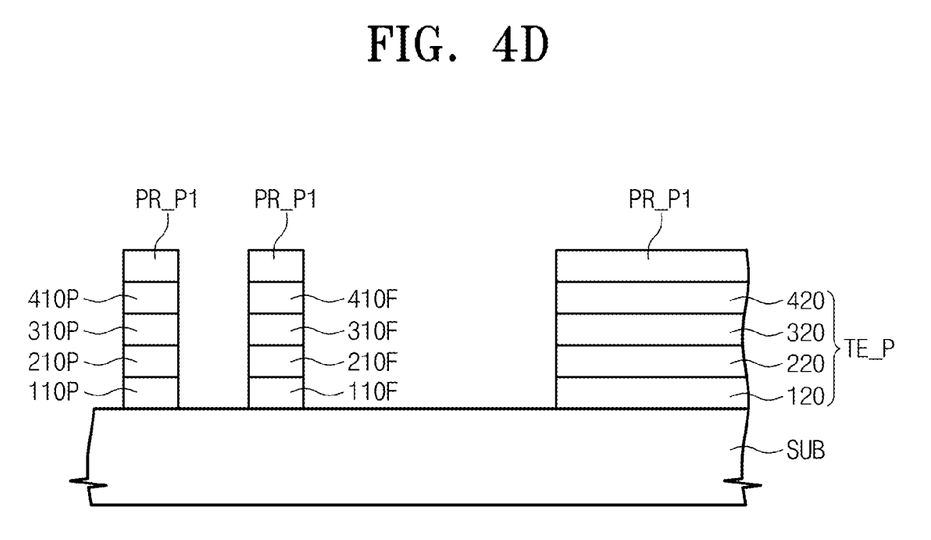
Figure 4E:
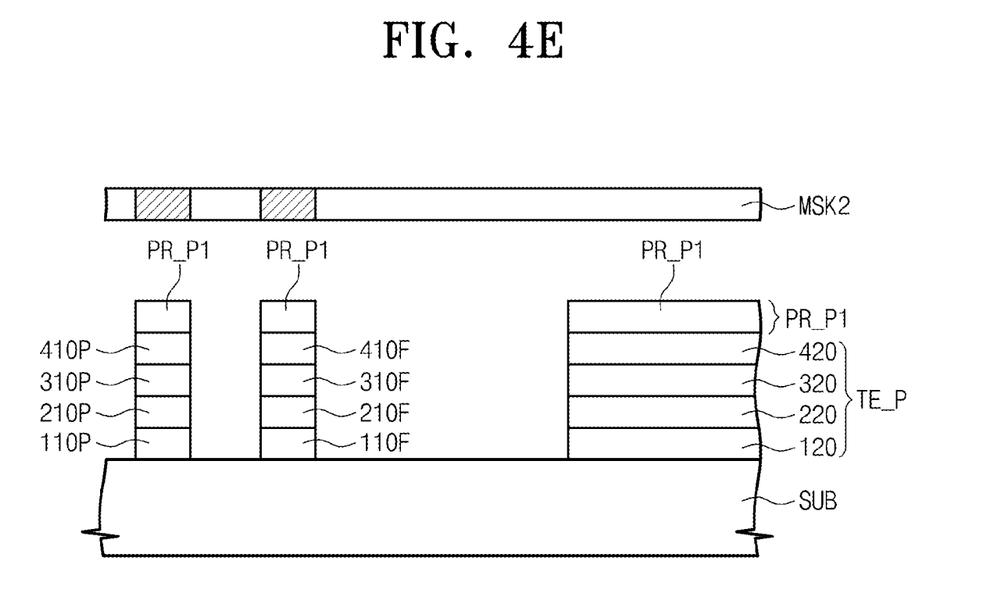
Figure 4F:
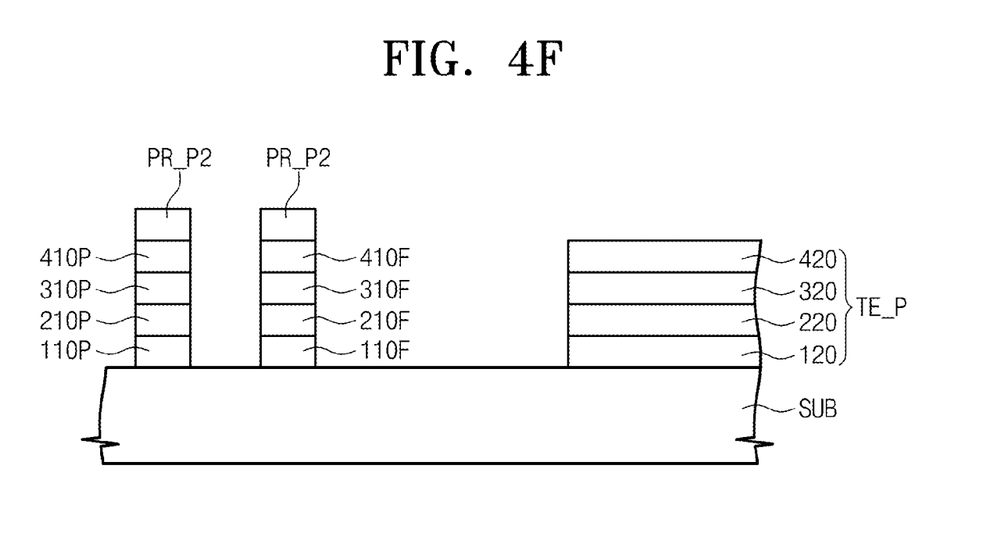
Figure 4G:
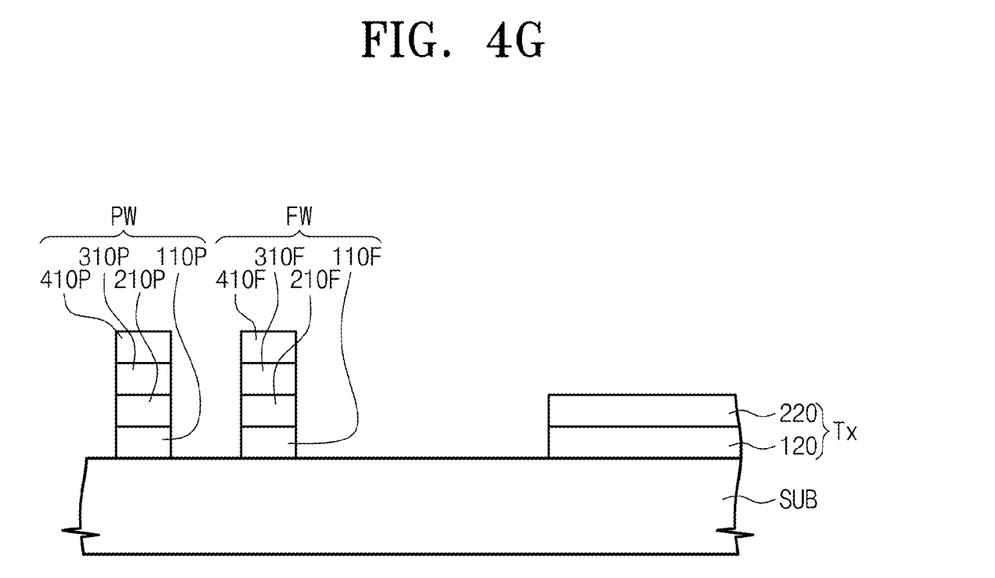

The peripheral wiring OW includes a first peripheral layer 110P, 110F, a transparent peripheral layer 210P, 210F, a second peripheral layer 310P, 310F, and a corrosion stop layer 410P, 410F. The transparent peripheral layer 210P, 210F is formed on the first peripheral layer 110P, 110F. The second peripheral layer 310P, 310F is formed on the transparent peripheral layer 210P, 210F. The corrosion stop layer 410P, 410F is formed on the second peripheral layer 310P, 310F. The corrosion stop layer 410P, 410F is formed on the second peripheral layer 310P, 310F.

The sensing pattern TE_P includes a first sensing layer 120, a transparent sensing layer 220, a second sensing layer 320, and a corrosion stop pattern layer 420. The first sensing layer 120 is formed on the same layer as the first peripheral layer 110P, 110F. The transparent sensing layer 220 is formed on the first sensing layer 120 and is formed on the same layer as the transparent peripheral layer 210P, 210F. The second sensing layer 320 is formed on the transparent sensing layer 220 and is formed on the same layer as the second peripheral layer 310P, 310F. The corrosion stop patter layer 420 is formed on the second sensing layer 320 and is formed on the same layer as the corrosion stop layer 410P, 410F.

Referring to FIG. 3, the method of manufacturing a touch screen panel according to an embodiment includes selectively etching the second layer 300 and the third layer 400 of the sensing pattern TE_P to form a sensing electrode TE (S600).

The forming (S600) of the sensing electrode TE may include selectively etching and removing the first photoresist pattern corresponding to the sensing pattern TE_P of the first photoresist patterns PR_P1 by using a second mask MSK2 to form a second photoresist pattern PR_P2. The forming (S600) may also include etching and removing the second and third layers corresponding to the sensing pattern TE_P of the second layer 300 and the third layer 400 by using the second photoresist pattern PR_P2 as a mask to form a sensing electrode TE.

Referring to FIGS. 1 to 3 and FIG. 4E, a second mask MSK2 is formed over the first photoresist pattern PR_P1.

Referring to FIGS. 1 to 3 and FIG. 4F, the first photoresist pattern corresponding to the sensing pattern TE_P of the first photoresist patterns PR_P1 is selectively etched and removed to form a second photoresist pattern PR_P2.

Referring to FIGS. 1 to 3 and FIG. 4G, the second and third layers corresponding to the sensing pattern TE_P of the second and third layers 300 and 400 are etched by using the second photoresist pattern PR_P2 as a mask to form a sensing electrode TE. The second and third layers corresponding to the sensing pattern TEP_P of the second and third layers 300 and 400 may be etched by a single etching operation.

According to the method of manufacturing a touch screen panel, since a corrosion stop layer is formed of a third layer having a low reactivity, wirings may be prevented from being corroded under the condition of high temperature and high humidity. As described above, the condition of high temperature and high humidity may indicate a condition of a temperature of about 50° C. to about 100° C. and a humidity of about 80% to about 100%. For example, the condition of high temperature and high humidity includes a condition of a temperature of about 85° C. and a humidity of about 85%, or a condition of about 60° C. and a humidity of about 93%. The humidity may be an absolute humidity or a relative humidity. Alternatively, the second layer may be formed of a material having a low resistivity to be used as a constituent material of the second peripheral layer, thus minimizing the resistance of the peripheral wiring. Thus, the response rate of the touch screen panel may be enhanced and the power consumption may be reduced. The method of manufacturing a touch screen panel according to an embodiment may provide a touch screen panel capable of improving reliability by preventing wirings from being corroded and enhancing the response rate.

According to at least one of the disclosed embodiments, the touch screen panels may improve reliability.

According to at least one of the disclosed methods of manufacturing a touch screen panel, a touch screen panel with improved reliability may be provided.

While the inventive technology has been described above with reference to the accompanying drawings, those skilled in the art will understand that the inventive concept may be implemented in various ways without changing the necessary features or the spirit of the present disclosure. Thus, the above embodiments should be construed to be exemplary rather than as limitative.

What is claimed is:

1. A touch screen panel for a display device, the touch screen panel comprising:
a touch substrate including a touch non-recognizing area and a touch recognizing area;
a peripheral wiring on the touch non-recognizing area, wherein a structure of the peripheral wiring comprises:
a first peripheral layer;
a transparent peripheral layer on the first peripheral layer;
a second peripheral layer on the transparent peripheral layer; and
a corrosion stop layer on the second peripheral layer; and a sensing electrode on the touch recognizing area and electrically connected to the peripheral wiring, wherein the electrode comprises:
a first sensing layer at the touch recognizing area, the first sensing layer including a same material as the first peripheral layer and disposed at a same layer as the first peripheral layers; and
a transparent sensing layer including a same material as the transparent peripheral layer and on the first sensing layer and on a same layer as the transparent peripheral layer, and
wherein the first peripheral layer, the transparent layer, the second peripheral layer, and the corrosion stop layer are sequentially stacked along a thickness direction of the touch substrate, and the side surfaces of each of the first peripheral layer, the transparent layer, the second peripheral layer, and the corrosion stop layer are aligned with each other along the thickness direction,
wherein the structure of the peripheral wiring is spaced apart from the touch recognizing area,
wherein the first peripheral layer, the transparent peripheral layer, the second peripheral layer, and the corrosion stop layer are sequentially formed on the touch substrate in both the touch non-recognizing area and the touch recognizing area, and
wherein the sensing electrode is formed by selectively etching and removing the second peripheral layer and the corrosion stop layer from the touch recognizing area.

2. The touch screen panel of claim 1, wherein the second peripheral layer has a lower resistivity than the corrosion stop layer.

3. The touch screen panel of claim 1, wherein the corrosion stop layer comprises one or more of indium tin oxide (ITO), indium zinc oxide (IZO) and indium gallium zinc oxide (IGZO).

4. The touch screen panel of claim 1, wherein the corrosion stop layer comprises one or more of titanium (Ti), silver (Ag), gold (Au), platinum (Pt), a silver palladium copper alloy (APC), and a silver palladium alloy (AP).

5. The touch screen panel of claim 1, further comprising a drive chip configured to provide a sensing signal to the sensing electrode,
   wherein the touch non-recognizing area includes a pad area and a fan-out area,
   wherein the peripheral wiring includes a pad wiring and a fan-out wiring,
   wherein the drive chip is disposed in the pad area,
   wherein the pad wiring electrically connects the drive chip to the sensing electrode, and
   wherein the fan-out wiring is disposed in the fan-out area.

6. The touch screen panel of claim 1, wherein each of the first peripheral layer and the first sensing layer comprises silver (Ag).

7. The touch screen panel of claim 6, wherein each of the first peripheral layer and the first sensing layer comprises a silver nano-wire.

8. The touch screen panel of claim 7, wherein each of the transparent sensing layer and the transparent peripheral layer comprises one or more of indium tin oxide (ITO), indium zinc oxide (IZO) and indium gallium zinc oxide (IGZO).

9. The touch screen panel of claim 8, wherein the second peripheral layer comprises one or more of aluminum (Al), molybdenum (Mo), and neodymium (Nd).

10. The touch screen panel of claim 1, wherein the sensing electrode comprises:
   a plurality of first sensing electrodes extending in a first direction and spaced apart from each other; and
   a plurality of second sensing electrodes extending in a second direction crossing the first direction, spaced apart from each other, and insulated from the first sensing electrodes.

* * * * *

UNITED STATES PATENT AND TRADEMARK OFFICE
CERTIFICATE OF CORRECTION

PATENT NO. : 10,921,929 B2
APPLICATION NO. : 14/601665
DATED : February 16, 2021
INVENTOR(S) : Kim et al.

Page 1 of 1

It is certified that error appears in the above-identified patent and that said Letters Patent is hereby corrected as shown below:

In the Claims

Column 12, Line 31, Claim 1   Delete "wherein the electrode",
                              Insert -- wherein the sensing electrode --

Column 12, Line 35, Claim 1   Delete "first peripheral layers;",
                              Insert -- first peripheral layer; --

Signed and Sealed this
Nineteenth Day of April, 2022

Katherine Kelly Vidal
*Director of the United States Patent and Trademark Office*